(12) United States Patent
Aust et al.

(10) Patent No.: US 12,049,923 B2
(45) Date of Patent: Jul. 30, 2024

(54) CUTTING-RING ASSEMBLY

(71) Applicant: AKTIEBOLAGET SKF, Gothenburg (SE)

(72) Inventors: Wolfgang Aust, Bamberg (DE); Josef Hahn, Schweinfurt (DE); Sebastian Krug, Schweinfurt (DE); Henning Neulitz, Lüchow (DE); Christian Waldvogel, Hassfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/586,849

(22) Filed: Jan. 28, 2022

(65) Prior Publication Data
US 2022/0252103 A1 Aug. 11, 2022

(30) Foreign Application Priority Data
Feb. 8, 2021 (DE) .......................... 102021102833.7

(51) Int. Cl.
*F16C 33/78* (2006.01)
*F16C 19/38* (2006.01)
*F16C 25/06* (2006.01)

(52) U.S. Cl.
CPC ........ *F16C 33/7813* (2013.01); *F16C 19/386* (2013.01); *F16C 25/06* (2013.01); *F16C 2352/00* (2013.01)

(58) Field of Classification Search
CPC .... F16C 33/7813; F16C 25/06; F16C 19/386; F16C 2352/00; E21B 10/12; E21B 10/22; E21D 9/1006
See application file for complete search history.

(56) References Cited

U.S. PATENT DOCUMENTS 3,707,315 A * 12/1972 Goodfellow .......... F16C 19/386
384/92
3,734,213 A * 5/1973 Goodfellow ............ E21B 10/12
451/540

(Continued)

FOREIGN PATENT DOCUMENTS

| CN | 106838016 A | * | 6/2017 | ............ F16C 33/586 |
| WO | WO-2012076361 A1 | * | 6/2012 | ........... B30B 11/208 |

OTHER PUBLICATIONS

Machine Translation of CN-106838016-A (Year: 2017).*

(Continued)

*Primary Examiner* — Alan B Waits
(74) *Attorney, Agent, or Firm* — J-TEK LAW PLLC; Scott T. Wakeman; Mark A. Ussai

(57) ABSTRACT

A cutting-ring assembly configured for use in a tunnel boring machine includes a cutting ring, an axle, and a bearing unit. The cutting ring is rotatably supported on the axle via the bearing unit, and the bearing unit includes at least one rotating outer ring having a first raceway and a second raceway, at least one fixed inner ring having a first raceway and a second raceway, and rolling elements between the raceways. Either the at least one inner ring or the at least one outer ring includes a first ring having an elongated axially extending shoulder and a second ring having an elongated axially extending shoulder abutting against the elongated axially extending shoulder of the first ring.

16 Claims, 3 Drawing Sheets

(56) References Cited

U.S. PATENT DOCUMENTS

| | | | | |
|---|---|---|---|---|
| 3,752,243 | A | * | 8/1973 | Hummer ............... F16C 19/548 |
| | | | | 277/369 |
| 3,791,705 | A | | 2/1974 | Schimel |
| 3,981,370 | A | * | 9/1976 | Bingham ................ E21D 9/104 |
| | | | | 175/361 |
| 4,793,427 | A | * | 12/1988 | Lambson ................ E21B 10/12 |
| | | | | 175/373 |
| 5,577,565 | A | * | 11/1996 | Kocab ..................... E21B 10/22 |
| | | | | 175/372 |
| 5,598,895 | A | | 2/1997 | Anderson et al. |
| 2004/0168833 | A1 | * | 9/2004 | Narvestad ............... E21B 10/20 |
| | | | | 175/373 |
| 2015/0028657 | A1 | | 1/2015 | Narvestad |
| 2015/0285073 | A1 | * | 10/2015 | Burger ................... E21C 25/18 |
| | | | | 299/39.1 |
| 2019/0178287 | A1 | * | 6/2019 | Edelmann ........... F16C 33/7883 |

OTHER PUBLICATIONS

Machine Translation of WO-2012076361-A1 (Year: 2012).*
Office Action from the German Patent Office dated Sep. 10, 2021 in related application 10 2021 102 833.7, and partial translation thereof.

* cited by examiner

CUTTING-RING ASSEMBLY

CROSS-REFERENCE

This application claims priority to German patent application no. 10 2021 102 833.7 filed on Feb. 8, 2021, the contents of which are fully incorporated herein by reference.

TECHNOLOGICAL FIELD

The present disclosure is directed to a cutting-ring assembly, and more specifically to a cutting ring assembly that includes a bearing supporting a cutting ring for rotation.

BACKGROUND

A tunnel boring machine is an excavation device that is usually used for boring tunnels through soil and rock layers. In a conventional tunnel boring machine, the boring head rotates and generates a smooth circular tunnel wall. On the axial front side of the boring head, which has a circular surface, a plurality of cutting-ring assemblies are disposed that are also rotatably supported. Here the rotational axes of the cutting-ring assemblies are disposed radially outward from the rotational axis of the boring head.

During the boring process, the boring head of the tunnel boring machine is pressed against the target surface with considerable force so that at least some of the cutting-ring assemblies engage into the surface. When the boring head of the tunnel boring machine rotates, the cutting rings fractionate, crush, and/or release the ground material, which is then transported away from the tunnel boring machine. When the released material is removed, the tunnel boring machine bores the tunnel.

In order to be able to rotatably support the cutting-ring assembly, the cutting ring is installed on a housing that is connected to an axle via two rolling-element bearings. A decisive criterion for the service life of the cutting-ring assembly is the service life of the two rolling-element bearings that are used to support the cutting ring. The service life of a bearing is dependent inter alia on a defined rolling movement of the rolling elements of the bearing. However, when the bearing assembly of the cutting ring is installed, it is difficult to determine whether such a defined rolling movement of the rolling elements is taking place in the installed bearing assembly.

SUMMARY

It is therefore an aspect of the present disclosure to provide a cutting-ring assembly having an improved service life.

In the following a cutting-ring assembly, in particular for a tunnel boring machine, is disclosed. The cutting-ring assembly comprises a cutting ring, an axle, and a bearing unit. The cutting ring is rotatably supported on the axle via the bearing unit, and the bearing unit includes a rotating outer ring, a fixed inner ring, and at least two rolling element rows, spaced from each other, each including a plurality of rolling elements. The rolling-element roll on associated inner and outer raceways that are disposed on the inner ring and the outer ring, and the bearing unit is preloadable using a preload element. The rolling elements are preferably tapered rollers. Tapered rollers are suited in particular to support both high axial and radial loads.

In order to permit a defined rolling movement of the rolling elements of the bearing unit in an installed state and thereby increase the service life of the bearing unit, the inner ring or the outer ring includes a first part and a second part, wherein the first and the second part each have an elongated shoulder that extend in the axial direction. Here the elongated shoulders lie opposite each other, such that in an installed state the elongated shoulders of the first and of the second part abut against each other. In particular, a defined rolling movement of the rolling elements on the raceways can thereby be achieved, since the spacing of the two rolling-element rows of the bearing unit, and thus the arrangement of the rolling elements on the raceways, is defined by the elongated shoulders.

The elongated shoulders can be formed integrally with the ring parts. The defined spacing of the ring parts to each other, achieved by the elongated shoulders, is important in particular with tapered rollers, wherein an interlocking of the rolling elements on the raceway, or a sliding movement on the raceways, due to a non-optimized arrangement of bearing rings and rolling elements with respect to each other, must be strictly prevented. At the same time it should also be ensured that the preload on the rolling elements is not excessive, since a too-high load is thereby induced, which can also lead to a shortened service life.

According to one preferred exemplary embodiment, in particular with the use of tapered roller bearings, the bearing unit is preloaded, wherein in the preloaded state the elongated shoulders abut against each other and thus make it possible to provide a fixed preload in the bearing unit. An even better defined movement of the rolling elements, as well as an extension of the service life of the bearing unit, can thereby be achieved.

In order to provide this preload, the bearing unit can be preloaded using a preload element, wherein, as mentioned, the elongated shoulders of the first and of the second part abut against each other in a preloaded state. A clamping ring or a shaft nut can be provided as preload element.

It is particularly preferred that the bearing unit can be configured as a preinstalled bearing unit. The bearing unit can thereby be easily inserted into a housing that carries the cutting ring. This facilitates the exchangeability of the bearing unit even under harsh environmental conditions, such as, for example, in the presence of dirt and dust.

According to a further preferred exemplary embodiment, the inner ring and the outer ring are configured two-part. Alternatively an exemplary embodiment can also be preferred wherein the ring that does not include the elongated shoulders is formed one-part so that the bearing unit includes a one-part ring and a two-part ring. The providing of a one-part ring can increase the stability of the bearing unit. In addition, this makes possible a simple exchanging of the bearing unit as a preinstalled bearing unit.

The fixed inner ring is preferably formed two-part and includes the elongated shoulder or the spacer.

As mentioned above, the bearing unit is advantageously disposed in a housing, and the cutting ring is fixed radially on the outside of the housing. Here it is particularly advantageous when the cutting ring and the housing are formed two-part that the cutting ring is releasably attached to the housing. Since the cutting ring is a further wear part of the cutting ring assembly, in addition to the bearing unit, due to the releasable attaching of the cutting ring to the outer side of the housing the cutting ring can be easily released and exchanged. The cutting ring is preferably secured by a retaining ring.

The housing itself can include a housing ring that carries in particular the cutting ring, an end cap and a closure cap, wherein the end cap and/or the closure cap can be configured to seal the housing. Penetration of external contaminants, such as, for example, rock, earth, sludge, etc. into the housing, and thus toward the bearing unit, can thereby be prevented.

According to a further preferred exemplary embodiment, a seal device, preferably a dynamic seal, such as, for example, a sliding ring seal, is provided between the end cap and the housing ring and/or between the housing ring and the closure cap. Sliding ring seals are dynamic seals that seal a rotating component, in this case the housing ring, with respect to a fixed component, in this case the end cap and/or closure cap. Penetration of external contaminants, such as, for example, rock, earth, sludge, etc., into the bearing unit can thereby be more efficiently prevented, whereby its service life is further increased. Of course, other seal devices are also usable.

According to a further preferred embodiment, the housing is secured on the axle by a shaft nut which is preferably simultaneously configured as a preload element. Using a single element, in this case the shaft nut, the housing can thereby be attached to the shaft, and a preload of the bearing unit can also be achieved. Of course, however, the preload and the securing of the housing can also be achieved by separate elements.

Alternatively or additionally, the bearing unit furthermore includes a first and preferably a second seal assembly that additionally seals the bearing interior. The seal assembly is preferably part of the preinstalled bearing unit and is disposed together with the bearing unit on the shaft or in the housing. The seal assembly is preferably disposed on at least one axial outer side of the bearing unit between the inner ring and the outer ring. The bearing unit can thereby be even better protected from contaminants, which also further increases the service life of the bearing unit.

A seal assembly can preferably be provided on both axial outer sides of the bearing unit. According to one preferred exemplary embodiment, the seal assembly is configured as a cassette seal. The cassette seal can be installed as an independent unit during the installation of the bearing unit into the housing or onto the shaft, but it can also be present as part of the preinstalled bearing unit.

A further aspect of the present disclosure relates to a tunnel boring machine including at least one cutting-ring assembly as described above.

Further advantages and advantageous embodiments are specified in the description, the drawings and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
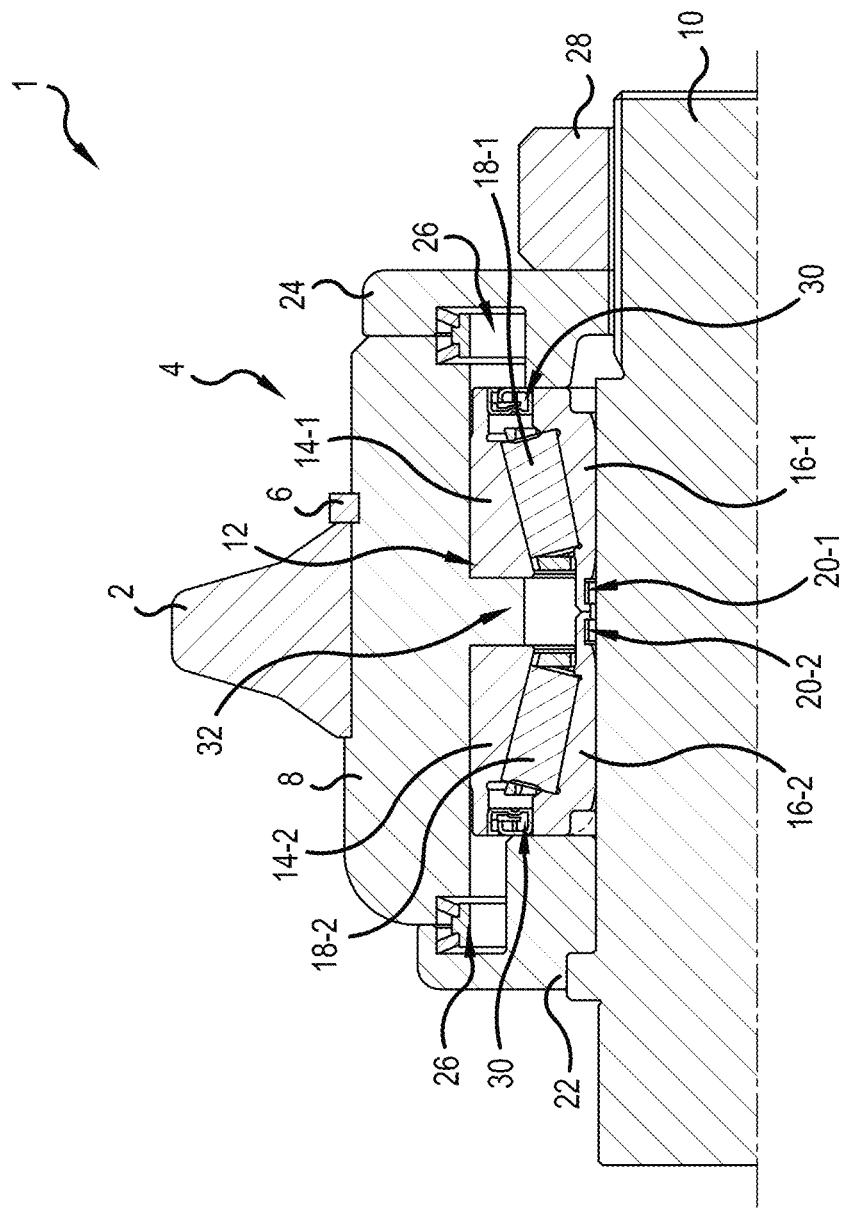
FIG. 1 is a cross-sectional view through a cutting-ring assembly according to a first embodiment of the present disclosure.

FIG. 1 shows a cross-sectional view through a cutting-ring assembly 1 according to a first embodiment. The cutting-ring assembly 1 comprises a cutting ring 2 that is configured to engage into a surface in order to bore, for example, a tunnel. The cutting ring 2 is releasably attached, as a separate element, radially outwardly on a housing 4, and secured via a retaining ring 6. Here the cutting ring 2 extends circumferentially around the housing 4. Due to the two-part design of housing 4 and cutting ring 2 and the releasable attachment of the cutting ring 2 to the housing 4, a simple exchangeability of the cutting ring 2 is achieved.

The housing 4 includes a housing ring 8 that is disposed concentrically with an axle 10. Between the housing ring 8 and the axle 10, a bearing unit 12 is disposed that makes possible a rotation of the cutting ring 2 together with the housing ring 8.

The bearing unit 12 comprises a rotating two-part outer ring 14-1, 14-2, a fixed inner ring including a first part 16-1 and a second part 16-2, and at least two rolling element rows spaced from each other, including respective rolling elements 18-1, 18-2, wherein the rolling elements 18-1, 18-2 are tapered rollers. The rolling elements 18-1, 18-2 roll on associated inner and outer raceways that are disposed on the inner rings 16-1, 16-2 and the outer rings 14-1, 14-2. Furthermore, the housing ring 8 of FIG. 1 comprises a stop 32 on which the outer ring parts 14-1, 14-2 abut in an installed state.

The first part 16-1 and the second part 16-2 of the inner ring each have an elongated shoulder 20-1, 20-2 that extend toward each other in the axial direction. The elongated shoulders 20-1, 20-2 are formed integrally with the ring parts 16-1, 16-2 of the inner ring 16. Alternatively the elongated shoulders can also be formed as a spacer, separate from the ring parts 16-1, 16-2, that is inserted separately between the ring parts 16-1, 16-2, to form the elongated shoulders 20-1, 20-2.

In the cutting-ring assembly 1 shown in FIG. 1, the elongated shoulders 20-1, 20-2 oppose each other so that in an installed state they abut against each other. That is, in the installed state the outer ring parts 14-1, 14-2 abut against the stop 32 of the housing ring 8, and the elongated shoulders 20-1, 20-2 of the inner ring parts 16-1, 16-2 abut against each other. A defined position of the outer and inner ring parts 14-1, 14-2, 16-1, 16-2 in the installed state can thereby be achieved, whereby a defined rolling movement of the rolling-element rows 18-1, 18-2 on the raceways is also achieved, since the spacing of the two rolling-element rows 18-1, 18-2 of the bearing unit 12, and thus the arrangement of the rolling elements 18-1, 18-2 on the raceways, is defined by the elongated shoulders 20-1, 20-2.

The bearing unit 12 is configured as a preinstalled bearing unit so that it is easily insertable into the housing 4 that carries the cutting ring 2. This facilitates the exchangeability of the bearing unit 12, even under harsh environmental conditions, such as, for example, in the presence of dirt and dust.

The housing 4 further includes an end cap 22 and a closure cap 24; here both the end cap 22 and the closure cap 24 are connected to the existing axle 10. In particular, during an installation of the cutting-ring assembly 1, the end cap 22 can first be pushed onto the axle 10, and subsequently the preinstalled bearing unit 12 and the housing ring 8, and finally the closure cap 24, are pushed onto the axle 10.

The housing 4 assembled from the end cap 22, the housing ring 8, and the closure cap 24 is secured on the axle 10 by a shaft nut 28 that simultaneously serves as a preload element in order to preload the bearing unit 12. In the preloaded state the elongated shoulders 20-1, 20-2 abut against each other and thus make it possible to achieve a fixed preload in the bearing unit 12, whereby an even better defined movement of the rolling elements 18-1, 18-2, as well as an extension of the service life of the bearing unit 12, can be achieved. Alternatively or additionally, a clamping ring can also be provided as a preload element. For example, such a clamping ring can connect the two elongated shoulders 20-1, 20-2 of the inner ring parts 16-1, 16-2.

If the housing 4 is secured by the shaft nut 28, so that the bearing unit 12 is simultaneously preloaded, a force flow from the shaft nut 28 is built up in the bearing unit, which force flow runs from the inner ring part 16-1, via the rolling elements 18-1, the outer ring part 14-1, the stop 32 of the housing ring 8, the outer ring part 14-2, the rolling elements 18-2 to the inner ring part 16-2, and via the elongated shoulders 20-1, 20-2 back again to the inner ring part 16-1. As soon as the bearing unit is deflected, a defined preloaded state is achieved, wherein all elements described above correspondingly abut against one another. The rolling-element rows 18-1, 18-2 are thereby released, whereby a defined rolling movement of the rolling-element rows 18-1, 18-2 is made possible, since the spacing of the two rolling-element rows 18-1, 18-2 of the bearing unit 12, and thus the arrangement of the rolling elements 18-1, 18-2 on the raceways, is defined by the elongated shoulders 20-1, 20-2.

In order to prevent external contaminants from penetrating into the bearing unit 12, a seal device 26 is provided between the end cap 22 and the housing ring 8 and between the housing ring 8 and the closure cap 24. The seal device 26 is preferably a dynamic seal device, such as, for example, a sliding ring seal. In addition to the sliding ring seals 26, further seals 30 are provided on the axial outer sides of the bearing unit 12. In particular, the seals 30 can be configured as a cassette seals. The seals 30 are advantageously already provided in the preinstalled bearing unit 12.

Figure 2:
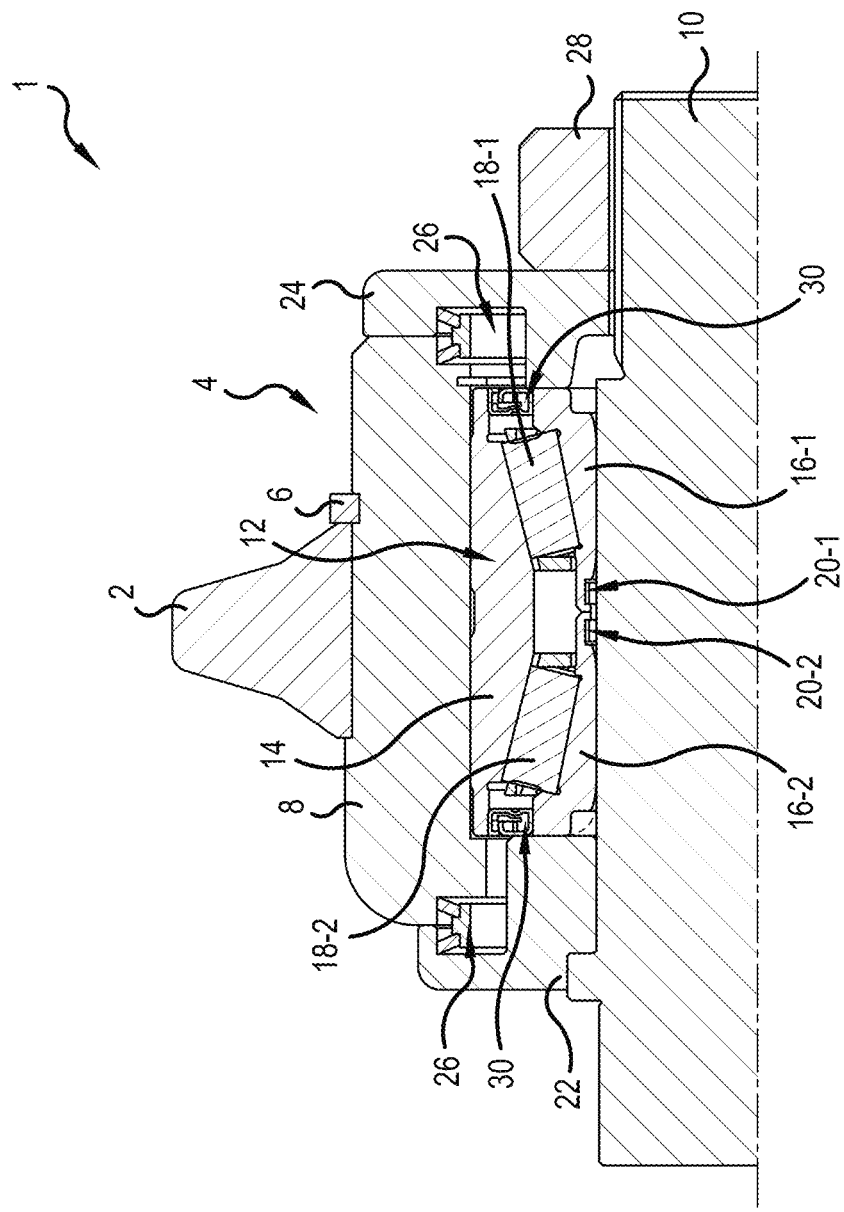
FIG. 2 is a cross-sectional view through a cutting-ring assembly according to a second embodiment of the present disclosure.
Figure 3:
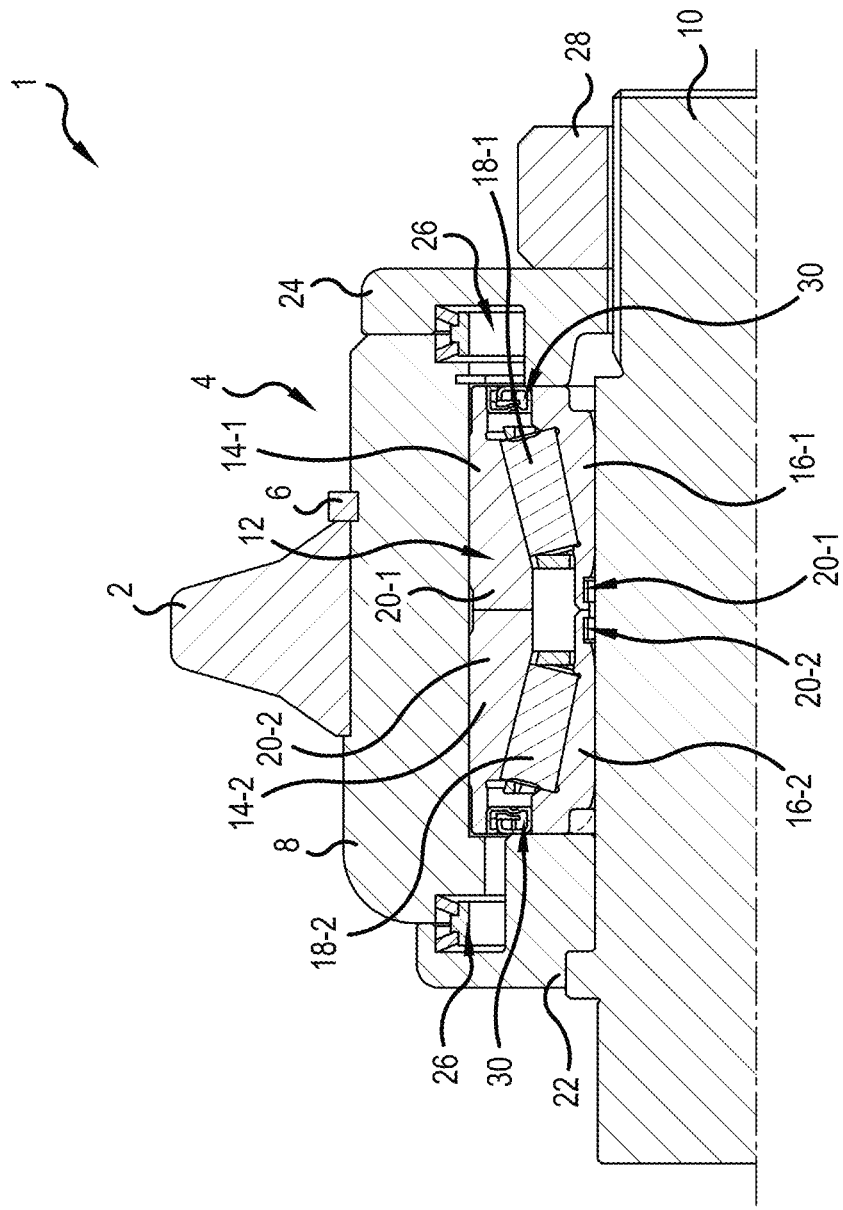
FIG. 3 is a cross-sectional view through a cutting-ring assembly according to a third embodiment of the present disclosure

FIGS. 2 and 3 each show a cross-sectional view through a cutting-ring assembly 1 according to further embodiments. The cutting-ring assembly 1 of FIG. 2 differs from the cutting-ring assembly 1 of FIG. 1 in that the outer ring 14 is configured as a one-part ring. Since the outer ring 14 is configured one-part, a stop 32 for the outer ring parts, as is shown in FIG. 1, is omitted. As can be seen in FIG. 2, the outer ring 14 of the bearing unit 12 is formed one-part, which ring does not include the elongated shoulders 20-1, 20-2. The providing of a one-part ring can increase the stability of the bearing unit 12. Further, the embodiment of FIG. 3 has a two-part outer ring 14-1, 14-2 with abutting elongated shoulders 20-1, 20-2.

In the case of the cutting-ring assembly 1 of FIG. 2, during the preloading of the bearing unit 12 the force flow extends from the inner ring part 16-1 via the rolling elements 18-1, the outer ring part 14, the rolling elements 18-2, and the inner ring part 16-2, and back again to the inner ring part 16-1. As soon as the bearing unit is deflected, a defined preloaded state is achieved, wherein all elements described above correspondingly abut against one another. The rolling-element rows 18-1, 18-2 are thereby released, whereby a defined rolling movement of the rolling-element rows 18-1, 18-2 is made possible, since the spacing of the two rolling-element rows 18-1, 18-2 of the bearing unit 12, and thus the arrangement of the rolling elements 18-1, 18-2 on the raceways, is defined by the elongated shoulders 20-1, 20-2.

In summary, the inner ring 16-1, 16-2 or the outer ring 14-1, 14-2 includes a first part and a second part, each including an elongated shoulder 20-1, 20-2 that extend in the axial direction, and opposite each other, so that the elongated shoulders 20-1, 20-2 of the first and of the second part 14-1, 16-1, 14-2, 16-2 abut against each other in the preloaded state. A defined preload of the bearing unit 12 can thereby be achieved, since the spacing of the two rolling-element rows 18-1, 18-2 of the bearing unit 12 is defined by the elongated shoulders 20-1, 20-2.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved cutting ring assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Cutting-ring assembly
2 Cutting ring
4 Housing
6 Retaining ring
8 Housing ring
10 Axle
12 Bearing unit
14, 14-1, 14-2 Outer ring
16-1, 16-2 Inner ring
18-1, 18-2 Rolling-element row
20-1, 20-2 Elongated shoulder
22 End cap
24 Closure cap
26 Sliding ring seal
28 Shaft nut
30 Seal
32 Stop

What is claimed is:

1. A cutting-ring assembly configured for use in a tunnel boring machine, comprising:
   a housing including a housing ring with opposing external axial ends,
   a cutting ring attached to the housing,
   an axle, and
   a bearing unit disposed within the housing,
   wherein the housing and the cutting ring are rotatably supported on the axle via the bearing unit,
   wherein the bearing unit includes at least one rotating outer ring having a first raceway and a second raceway, at least one fixed inner ring having a first raceway and a second raceway, a first row of rolling elements between the first raceway of the at least one outer ring and the first raceway of the at least one inner ring and a second row of rolling elements between the second raceway of the at least one outer ring and the second raceway of the at least one inner ring, and
   wherein:
   the at least one inner ring comprises a first inner ring having an elongated axially extending shoulder and a second inner ring having an elongated axially extending shoulder abutting against the elongated axially extending shoulder of the first inner ring such that the spacing of the first and second rows of rolling-elements is defined by the elongated shoulder of the first ring and the elongated shoulder of the second ring, and
   the housing includes a closure cap having an outer radial portion, the outer radial portion being disposed against one of the external axial ends of the housing ring so as to be located externally of the housing ring, and an inner radial portion disposed at least partially within the housing ring and against the first inner ring and a nut secures the housing about the axle, the nut engaging against the closure cap such that a preload force is exerted on the first inner ring, through the first row of rolling elements, the at least one outer ring, the second row of rolling elements, and the second inner ring and back to the first inner ring through the abutting shoulders of the first inner ring and the second inner ring.

2. The cutting-ring assembly according to claim 1, wherein the rolling elements comprise tapered rollers.

3. The cutting-ring assembly according to claim 1, wherein the axially extending shoulders are integrally formed.

4. The cutting-ring assembly according to claim 1, wherein the bearing unit is configured as a preinstalled bearing unit mounted in the housing, and
   wherein the cutting ring is releasably attached to the housing.

5. The cutting-ring assembly according to claim 4, wherein the end cap and/or the closure cap is configured to seal the housing.

6. The cutting-ring assembly according to claim 5, wherein a dynamic seal is provided between the end cap and the housing ring, and/or between the housing ring and the closure cap.

7. The cutting-ring assembly according to claim 1, wherein the bearing unit includes a first seal assembly and a second seal assembly each configured to seal an interior of the bearing unit, and
   wherein the first seal assembly is disposed on an axial outer side of the bearing unit between the inner ring and the outer ring.

8. The cutting-ring assembly according to claim 7, wherein the bearing unit is configured as a preinstalled bearing unit mounted in a housing, and
   wherein the first seal assembly and the second seal assembly are each part of the preinstalled bearing unit and each is configured as a cassette seal.

9. The cutting-ring assembly according to claim 1, wherein
   the at least one outer ring comprises a one-part outer ring.

10. A tunnel boring machine that includes at least one cutting-ring assembly according to claim 1.

11. The cutting-ring assembly according to claim 1, wherein the at least one outer ring includes a single outer ring disposed within the housing or two abutting outer rings disposed within the housing such that the preload force is transferred directly from the first row of rolling elements to the single outer ring or to the two abutting outer rings and then directly to the second row of rolling elements.

12. A cutting-ring assembly configured for use in a tunnel boring machine, comprising:
   a housing,
   a cutting ring attached to the housing,
   an axle, and
   a bearing unit disposed within the housing,
   wherein the housing and the cutting ring are rotatably supported on the axle via the bearing unit,
   wherein the bearing unit includes at least one rotating outer ring having a first raceway and a second raceway, a first fixed inner ring having a first raceway and a second fixed inner ring having a second raceway, a first row of rolling elements between the first raceway of the at least one outer ring and the first raceway of the first inner ring and a second row of rolling elements between the second raceway of the at least one outer ring and the second raceway of the second inner ring,
   wherein the first inner ring includes a first elongated axially extending shoulder and the second inner ring includes a second elongated axially extending shoulder abutting against the first shoulder, and
   wherein the bearing unit is configured as a preinstalled bearing unit mounted in the housing, the cutting ring being releasably attached to the housing, the housing including a housing ring having two external axial ends, an end cap and a closure cap, the end cap being disposed against one external axial end of the housing ring and configured to seal the housing and/or the closure cap being disposed against the other external axial end and configured to seal the housing, and at least one dynamic seal device including a one-piece seal ring having one axial end disposed within the housing ring axially external to the end cap or the closure cap and another axial end disposed within the end cap or the closure cap axially external to the housing ring.

13. The cutting-ring assembly according to claim 12, wherein the rolling elements of the first row of rolling elements comprise tapered rollers and the rolling elements of the second row of rolling elements comprise tapered rollers.

14. The cutting-ring assembly according to claim 13, wherein the at least one outer ring comprises no more than one outer ring.

15. The cutting-ring assembly according to claim 13, wherein the first fixed inner ring includes a body portion including the first raceway of the first fixed inner ring and wherein the first elongated axially extending shoulder is formed integrally with the body portion of the first fixed inner ring, and wherein the second fixed inner ring includes a body portion including the second raceway of the second fixed inner ring and wherein the second elongated axially extending shoulder is formed integrally with the body portion of the second fixed inner ring.

16. A tunnel boring machine that includes at least one cutting-ring assembly according to claim 13.

\* \* \* \* \*